United States Patent [19]

Greenleaf

[11] 4,222,985

[45] Sep. 16, 1980

[54] LABORATORY TOOL

[75] Inventor: Robert G. Greenleaf, Kennett Square, Pa.

[73] Assignee: Scientific Tools, Inc., Sophia, N.C.

[21] Appl. No.: 900,810

[22] Filed: Apr. 27, 1978

[51] Int. Cl.[2] .................... B01L 11/00; B23P 19/04; B25B 7/02

[52] U.S. Cl. .................... 422/99; 29/268; 81/425 R

[58] Field of Search .................... 422/99; 29/268; 81/5.1 R, 425 R, 425 A, 426

[56] References Cited

U.S. PATENT DOCUMENTS 1,678,313 7/1928 Atkinson .................... 29/268 X

*Primary Examiner*—Joseph Scovronek

*Attorney, Agent, or Firm*—Dann, Dorfman, Herrell & Skillman

[57] ABSTRACT

A laboratory tool for repairing connections for tubular elements and tubing by stripping the ferrule from the end of the laboratory tubing without damaging the tubing. The tool is designed to accommodate a plurality of tubing sizes, and includes a pliers-like instrument having posts projecting from one jaw, each post corresponding in diameter to the mean diameter of the tubing. The other jaw of the tool is slotted to accommodate the outside diameter of the tubing. The posts are arranged in series on one jaw with the largest diameter post being outermost and the slot in the opposite jaw has its greatest width adapted to register with the largest post. Each successively smaller post is positioned closer to the pivot of the jaws but with sufficient clearance from the previous post to permit a ferrule to slide over the post. In operation, the tool is engaged on opposite sides of the ferrule positioned in the tubing with the post in registry with the end of the tubing and the slot receiving the tubing on the opposite side of the ferrule. Closing the jaws then engages the marginal edges of the slot with the rearwardly-facing portion of the ferrule and permits the ferrule to be disengaged forwardly from the tubing. The disengagement of the ferrule from the tubing permits the tubing to be furnished with a fresh ferrule for reuse.

5 Claims, 5 Drawing Figures

LABORATORY TOOL

The present invention relates to laboratory tools and has particular application to a tool for repairing connections for tubing.

In laboratory instrumentation, the tubular elements are connected in fittings by the use of a frustoconical ferrule which is positioned on the free end of the tubing for telescopic engagement within the bore of the male member of the connection. The ferrule has a backup washer positioned behind it and to receive the thrust from a nut-like fastener which drives the ferrule into the bore and effects a gas-tight seal between the bore and the tubing. If the ferrule becomes scratched or if a leak develops between the ferrule and the outside of the tubing, it is necessary to replace the ferrule.

Prior to the present invention, a common technique was to simply cut off the tubing behind the ferrule and place a fresh ferrule in place on the cut end of the tubing. Such a technique is satisfactory where the length of the tubing is not critical, but for certain instrumentation, the length of the tubing is quite critical and repeated shortening of the length of the tubing by the length of a ferrule destroys the accuracy of the laboratory instrument. In such cases, particularly where the ferrule is firmly lodged in place on the tubing, as is the case when the nut is over-tightened, as occurs when the technician attempts to stop the leak by over-tightening the nut, the ferrule is impossible to remove with ordinary laboratory instruments without damaging the tube. A common technique is to file or grind the ferrule off the tube, but unless care is exercised, the exterior surface of the tube is damaged so that a replacement ferrule does not effectively seal against the tube.

Prior to the present invention, a device has been used which has opposed jaws which may be displaced relative to one another. On one of the jaws, a pin or similar device corresponding to the diameter of a specific size of tube is provided, and on the other jaw, a fork-like member is provided so that when the jaws are closed over the ferrule, the fork-like member engages behind the ferrule and displaces it off the end of the tube onto the pin. While this device has proved satisfactory, the need to have a separate device for each size of tubing used in the laboratory has detracted from its saleability.

With the foregoing in mind, the present invention provides a tool which is capable of use with a plurality of tubing sizes and which is designed to automatically accommodate to different tubing sizes, permitting a relatively unskilled operator to use the tool for its intended purpose.

More specifically, the present invention provides a laboratory tool for removing ferrules having a series of posts of diminishing size on one jaw and a slot of diminishing width on the other jaw whereby the slot is effective as a gauge to position to tool so that the proper post engages the tubing from which the ferrule is to be removed.

All of the objects of the invention are more fully set forth hereinafter with reference to the accompanying drawing, wherein.

Figure 1:
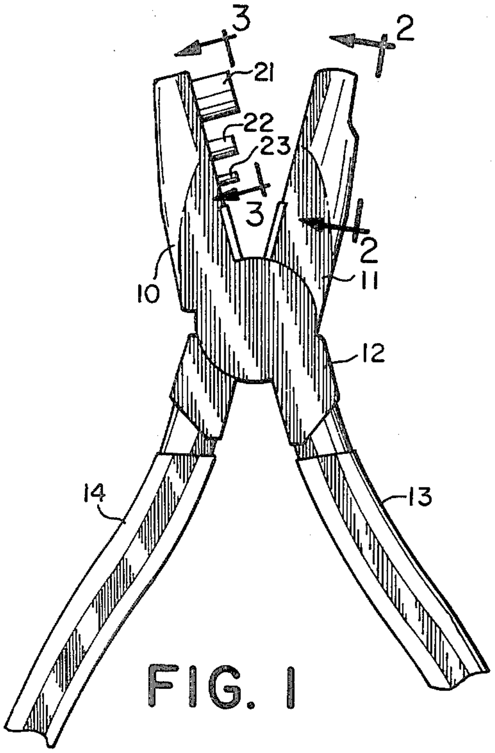
FIG. 1 is a fragmentary side view of a tool embodying the present invention.

Referring now to the drawings, FIG. 1 illustrates a tool embodying the present invention having a pair of jaws 10 and 11 pivotally mounted, as indicated at 12, for opening and closing movement by means of handles 13 and 14, respectively.

The jaw 10 is provided on the inner face which confronts the jaw 11 with a series of posts 21, 22 and 23 which are arranged with successively smaller diameters towards the pivotal axis 12 of the jaw. Each post corresponds to the mean diameter of a conventional size of laboratory tubing, i.e. the average of the inside and outside diameters. Thus, the post may abut against the end of a piece of tubing and firmly engage the tubing without entering the bore of the tubing and without overlapping the outside diameter. In this way, the post may engage the end of the tubing and permit the ferrule which is mounted externally on the tubing to be displaced over the post without interference. The adjacent post toward the axis 12 of the jaws is of a smaller diameter corresponding to the mean diameter of a smaller size of laboratory tubing, and the third post is of still smaller diameter. It is noted that the spacing between the posts is greater than the wall thickness of the conventional ferrule so that the adjacent post does not interfere with the displacement of the ferrule onto the post.

To assure firm engagement of the post with the tube end without substantial danger of distorting the tube end, the exposed end of the post is cut off at right angles to the cylindrical axis of the post so that the end surface of the post is truly circular. Since the posts extend outwardly from the jaws, in order to insure flush engagement with the end of the tubing, the cylindrical axis of each post is canted toward the pivotal axis 12 of the jaws in the range of 1°–5°, depending upon the length of the post and its distance from the pivotal axis 12 so that the end surface of the post is substantially parallel to the inwardly-facing surface of the opposite jaw 11 when the jaws are displaced towards the closed position and the end surface of the post is in alignment with the inwardly-facing surface of the jaw 11.

It should be noted that the posts project from the jaw 10 a smaller distance as the distance from the pivotal axis 12 decreases. This reduces the jaw to accommodate the same length of ferrule for all sizes of tubing. The illustrated arrangement of posts provides that the post of the greatest diameter has the greatest projection from the jaw 10.

Figure 2:
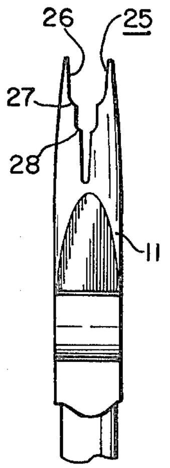
FIG. 2 is a fragmentary face view of one jaw of the tool as shown by the line 2—2 of FIG. 1.
Figure 3:
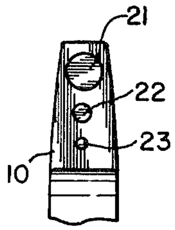
FIG. 3 is a face view of the other jaw as shown by the line 3—3 in FIG. 1.

The jaw 11 is provided with a slot 25 extending from its ultimate end inwardly toward the pivotal axis 12. As shown in FIG. 2, the slot diminishes in width as it nears the pivotal axis. At the ultimate end, the slot has a portion 26 which is adapted to receive the post 21 as the jaws are closed. The width of the portion 26 is greater than the outside diameter of the tubing for which the post 21 is designed by a dimension less than the wall thickness of the ferrule conventionally used with such tubing. Thus, the marginal portions of the slot portion 26 may straddle the tube and engage against the end surface of the ferrule. Inwardly beyond the portion 26, the next portion 27 is adapted to register with the post 22 and is likewise of a width greater than the exterior diameter of the tubing for which the post 22 is designed and less than the outer diameter of the ferrule for such tubing. Extending inwardly from the inner end of the portion 26, is a third portion 28 which is adapted to receive the pin 23 and is dimensioned similarly to the other slot portions.

Figure 4:
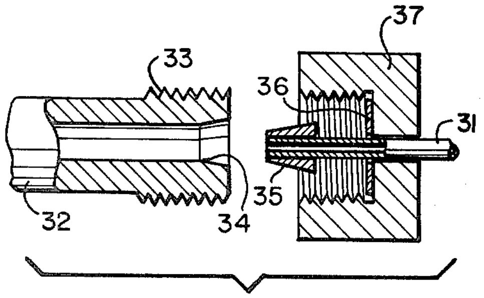
FIG. 4 shows a typical connection embodying a tube having a ferrule mounted thereon.
Figure 5:
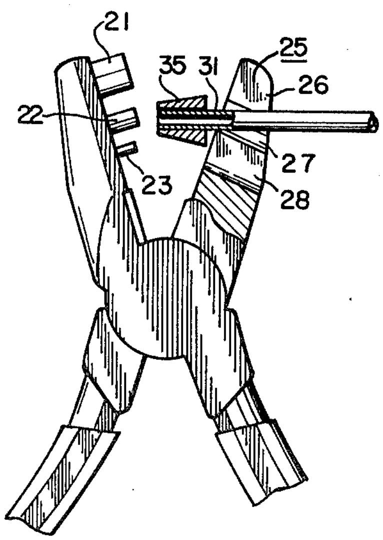
FIG. 5 illustrates the operation of the tool to remove the ferrule therefrom.

The operation of the tool is illustrated in FIG. 5 and, for the purpose of describing FIG. 5, it is appropriate to describe a conventional connection for which the tool is designed. FIG. 4 illustrates this connection wherein a piece of laboratory tubing 31 is designed to be engaged with a nipple 32. The nipple 32 is threaded as indicated at 33 and has a bore 34 for receiving the tube 31. To provide a seal between the tube 31 and the bore 34, a ferrule 35 is positioned on the end of the tube 31. The ferrule is designed to have a snug fit with the exterior diameter of the tube 31 so that when the tapered ferrule is forced into the bore 34 of the nipple, the malleable character of the brass (as a result of the compressive force exerted by the interior surface of the bore) effects a seal between the exterior surface of the ferrule 35 and the interior surface of the bore 34, and likewise, a seal between the interior surface of the ferrule 35 and the exterior surface of the tubing 31. A washer 36 is provided behind the ferrule 35 and a cap nut 37 is provided to tighten on the threaded portion 33 of the nipple. Thus, when the nut is properly tightened, it engages the ferrule 35 within the bore 34 and achieves a tight seal. If the ferrule is scratched, either on the inner or outer surface, for example by the presence of foreign matter, the seal may not be tight and leakage may occur. If, in the attempt to effect a tight seal, the connection is overtightened, the ferrule may be swaged onto the tubing so that it is impossible to remove with conventional laboratory tools without damaging the tubing. As pointed out above, a standard practice is to simply cut off the ferrule and shorten the tube by the length of the removed ferrule. This procedure is satisfactory where the length of the tube is not critical and where the laboratory has a good cut-off tool for providing a neat severed end for the tubing. If the tubing is not properly severed, it may not receive a fresh ferrule properly and it may not be possible to effect a good connection.

The tool of the present invention operates to remove a ferrule which is firmly lodged onto the tubing. As shown in FIG. 5, the washer and nut 36 and 37 are stripped back from the ferrule so that the tube 31 with the ferrule 35 is exposed. The tube 31 is then engaged in the slot 25 and by reason of the particular arrangement shown in FIG. 2, the tube will automatically position itself in the slot, in this case in the portion 27, in registry with the proper post so that the post, in this case the post 22, will then engage the exposed end of the tube centrally within the ferrule 35. Closing the jaws then engages the marginal portions of the slot against the rear end of the ferrule 35 and permits the closing pressure on the jaw to displace theferrule 35 from the end of the tube, in the present instance onto the post 22, which is registered with the tube by reason of the outer diameter of the tube connection within the portion 27 of the slot 25. Thus, the tool permits the operator to efficiently remove the ferrule without verifying the size of the tube.

While a particular embodiment of the present invention has been herein illustrated and described, it is not intended to limit the invention to such disclosure, but changes and modifications may be made therein and thereto within the scope of the following claims.

I claim:

1. A laboratory tool for repairing connections for tubing in which the tubing is provided with a ferrule snugly engaged on the free end of the tubing, said tool comprising a pair of opposed jaw members mounted for displacement toward and away from each other, said members having confronting surfaces, the confronting surface of one of said jaw members having a series of posts projecting therefrom toward the other jaw member, said series of posts being of decreasing diameter arranged with the post of greatest diameter at one end and the post of smallest diameter at the other end, the diameter of each post corresponding substantially to the mean diameter of a given size of laboratory tubing, the other jaw member having a slot extending therethrough and opening in its confronting surface, said slot being open at one end and diminishing in width toward the other end, the slot having portions along its length, each adapted to receive one of said projecting posts when said jaws are closed, the portion receiving the largest post having the largest width, the width of said slot portion being greater than the outside diameter of the size of tubing corresponding to said largest post and smaller than the outside diameter of the ferrule associated with said tubing, the adjacent portion of said slot having a width greater than the outside diameter of the size of tubing corresponding to the next post and less than the outside diameter of the ferrule associated with said tubing, and the portion of the slot receiving the smallest post having a width greater than the outside diameter of the given size of tubing corresponding to the outside diameter of the ferrule associated with said tubing, and the portion of the slot receiving the smallest post having a width greater than the outside diameter of the given size of tubing corresponding to said smallest post and less than the outside diameter of the ferrule for said tubing, whereby when a selected piece of tubing is engaged in said slot, it will position itself substantially in registry with the post corresponding to the size of tubing of said selected piece.

2. A laboratory tool according to claim 1 wherein said jaws are pivotally connected and said post of greatest diameter is most remote from said pivotal connection of the jaws and the post of smallest diameter is closest to said pivotal connection of said jaws.

3. A laboratory tool according to claim 2 wherein said posts are cylindrical and have an exposed end surface disposed at right angles to the cylindrical axis thereof.

4. A laboratory tool according to claim 3 wherein said jaws are pivoted for opening and closing movement about a pivotal axis, the cylindrical axis of each post being inclined between 1°–5° toward said pivotal axis, so that the end surface of said post is parallel to the confronting surface of the other jaw when said jaws are displaced to position said surfaces in substantial alignment.

5. A laboratory tool according to claim 4 wherein the length of said posts in the series diminishes from the largest post toward the smallest post.

* * * * *